(12) United States Patent
Nagura (10) Patent No.: US 8,698,071 B2
(45) Date of Patent: Apr. 15, 2014

(54) ROTARY ENCODER HAVING MULTIPLE SLIT ARRAYS, WHICH DETECTS ROTATION ANGLE

(75) Inventor: Chihiro Nagura, Yokohama (JP)

(73) Assignee: Canon Kabushiki Kaisha (JP)

( * ) Notice: Subject to any disclaimer, the term of this patent is extended or adjusted under 35 U.S.C. 154(b) by 426 days.

(21) Appl. No.: 12/972,927

(22) Filed: Dec. 20, 2010

(65) Prior Publication Data

US 2011/0155895 A1   Jun. 30, 2011

(30) Foreign Application Priority Data

Dec. 24, 2009   (JP) .................................. 2009-291688

(51) Int. Cl.
  *G01D 5/34*   (2006.01)
(52) U.S. Cl.
  USPC .................................................... 250/231.14
(58) Field of Classification Search
  USPC .................... 250/231.13–231.18; 341/13, 14; 356/614–622
  See application file for complete search history.

(56) References Cited

U.S. PATENT DOCUMENTS

| | | | |
|---|---|---|---|
| 4,767,925 A * | 8/1988 | Kawamoto | ............... 250/231.16 |
| 6,232,593 B1 * | 5/2001 | Taniguchi et al. | ........ 250/231.13 |
| 7,282,699 B2 | 10/2007 | Atsuta et al. | |

FOREIGN PATENT DOCUMENTS

| | | |
|---|---|---|
| JP | 2006-214929 A | 8/2006 |
| JP | 2007-147465 A | 6/2007 |

* cited by examiner

*Primary Examiner* — Thanh Luu
(74) *Attorney, Agent, or Firm* — Rossi, Kimms & McDowell LLP (57) ABSTRACT

A rotary encoder 100 includes a scale portion 201 in which a first slit array 202 having slits, the number of which is S1, and a second slit array 203 having slits, the number of which is S2, are formed concentrically with respect to a center point 220, and a sensor unit portion 302,304 including a first sensor 311,313 that detects a signal from the first slit array in a first read region 211,215 and a second sensor 312,314 that detects a signal from the second slit array in a second read region 212,216. The rotary encoder meets $R1_{min}/R2_{max} \leq S1/S2 \leq R1_{max}/R2_{min}$, where $R1_{max}$ and $R1_{min}$ are respectively the maximum and minimum values of a distance from the center point in the first read region and $R2_{max}$ and $R2_{min}$ are respectively the maximum and minimum values of a distance from the center point in the second read region.

6 Claims, 7 Drawing Sheets

ROTARY ENCODER HAVING MULTIPLE SLIT ARRAYS, WHICH DETECTS ROTATION ANGLE

BACKGROUND OF THE INVENTION

1. Field of the Invention

The present invention relates to a rotary encoder which detects a rotation angle.

2. Description of the Related Art

Previously, a rotary encoder has been used for measuring an angle in a machine tool, an FA apparatus, or the like. Types of detecting the angle in the rotary encoder are roughly divided into an incremental type and an absolute type. Japanese Patent Laid-Open No. 2006-214929 discloses an incremental-type rotary encoder. The incremental-type rotary encoder can be easily manufactured, but there is a problem that angle information is deleted if the electric power is turned off or errors are accumulated by an exogenous noise. On the other hand, an absolute-type rotary encoder has advantages that it is highly accurate since it does not accumulate errors and that the movement to a home position is not necessary even if the electric power is turned off.

Japanese Patent Laid-Open No. 2007-147465 discloses an absolute-type rotary encoder. The rotary encoder uses an angle detection method called vernier in which a phase difference between a plurality of periodic signals having different periods from each other is calculated to obtain a periodic signal that has a period different from each of the original periods.

In the previous vernier detection method, a relative phase between original periodic signals is changed when a scale is decentered with respect to a rotary shaft of the scale. If the decentering of the scale is large, a detection error of an angle signal obtained by the vernier detection increases and phase synchronization with a lower periodic signal cannot be ensured. Therefore, when the scale is fixed to the rotary shaft, a highly accurate adjustment is required and it prevents reducing the cost.

SUMMARY OF THE INVENTION

A rotary encoder as one aspect of the present invention includes a scale portion in which a first slit array having slits, the number of which is S1, and a second slit array having slits, the number of which is S2, are formed concentrically with respect to a center point, a sensor unit portion including a first sensor that detects a signal from the first slit array in a first read region and a second sensor that detects a signal from the second slit array in a second read region, and a signal processing circuit configured to process the signal detected by the sensor unit portion. The rotary encoder meets an expression of $R1_{min}/R2_{max} \le S1/S2 \le R1_{max}/R2_{min}$, where $R1_{max}$ and $R1_{min}$ are respectively the maximum value and the minimum value of a distance from the center point in the first read region and $R2_{max}$ and $R2_{min}$ are respectively the maximum value and the minimum value of a distance from the center point in the second read region.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

[Embodiment 1]

Figure 1:
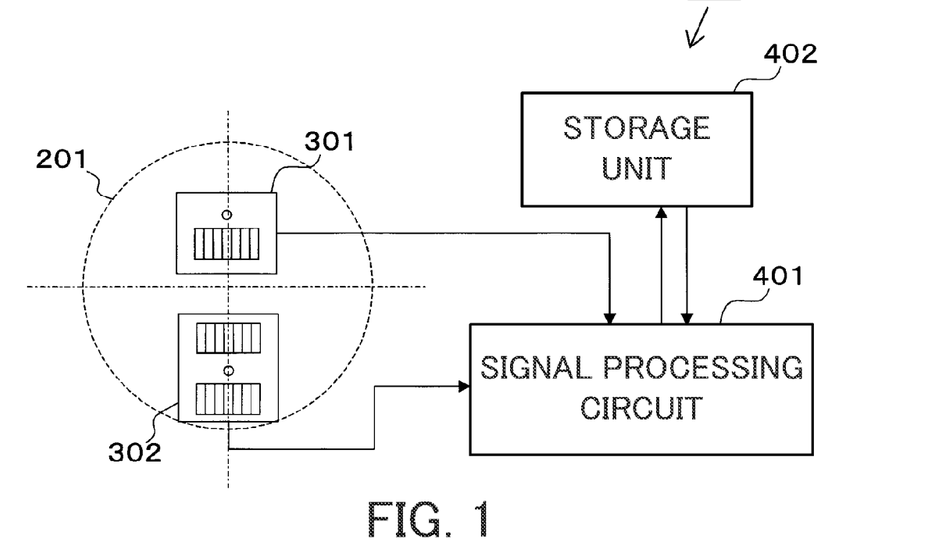
FIG. 1 is a configuration diagram of a rotary encoder in Embodiment 1.

FIG. 1 is a configuration diagram of a rotary encoder 100 in Embodiment 1. The rotary encoder 100 is an optical rotary encoder, which includes a rotary scale 201 (a scale portion) attached to a rotary shaft, an M-sequence sensor unit 301, a sensor unit 302, a signal processing circuit 401, and a storage unit 402. The M-sequence sensor unit 301 and the sensor unit 302 constitute a sensor unit portion. The signal processing circuit 401 processes a signal that is detected by the sensor unit portion. Specifically, the signal processing circuit 401 converts an electric signal obtained by the M-sequence sensor unit 301 into an angle value, performs an interpolation process of an encoder signal obtained by the sensor unit 302, writes a signal into the storage unit 402, reads a signal of the storage unit 402, and the like.

Figure 2:
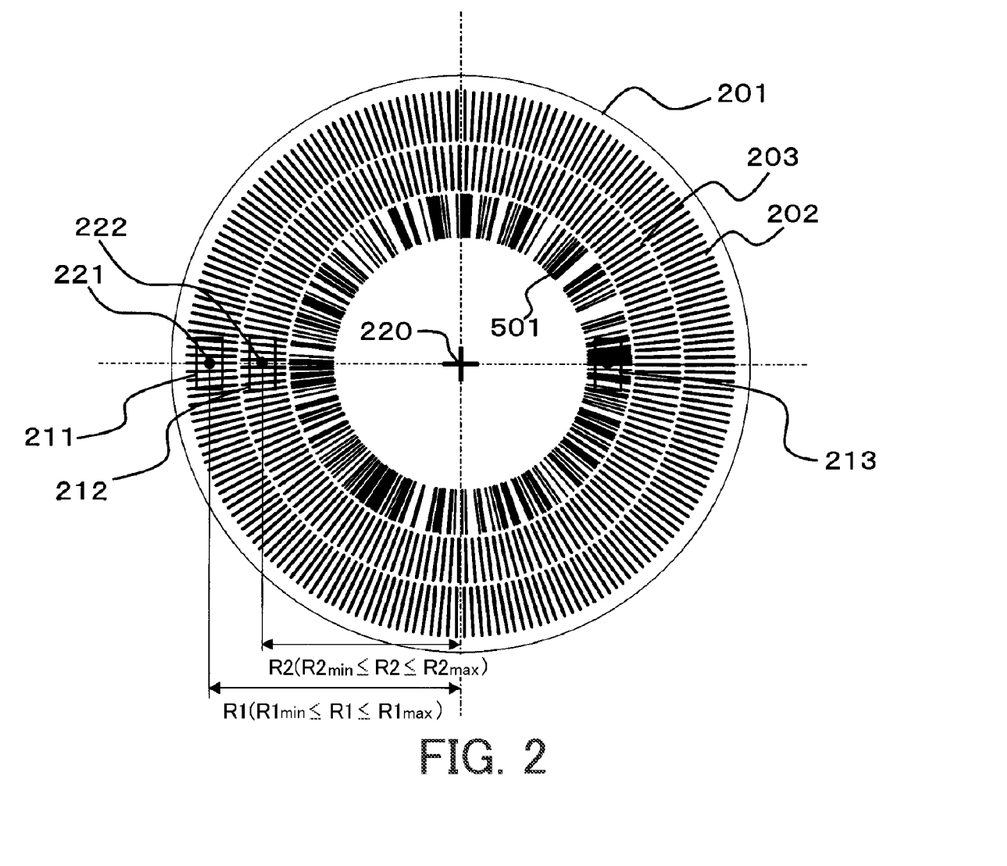
FIG. 2 is a configuration diagram of a rotary scale in Embodiment 1.

FIG. 2 is a configuration diagram of a rotary scale 201 in the present embodiment. In the rotary scale 201, patterns 501, 202, and 203 which constitute three slit arrays concentrically with respect to a center point 220 are formed by patterning a chrome reflection film on a glass substrate. The pattern 501 which is formed on an inner circumference of the rotary scale 201 is an M-sequence pattern as an absolute position detecting pattern. The pattern 202 on an outer circumference (a first slit array) is constituted by reflective slits, the number of which is a predetermined number S1. In the present embodiment, the number of the slits S1 of the pattern 202 is 200. The pattern 203 on an intermediate circumference (a second slit array) is constituted by reflective slits, the number of which is a predetermined number S2. In the present embodiment, the number of the slits S2 of the pattern 203 is 160. Each of these patterns 501, 202, and 203 is a radial pattern with reference to the center point 220.

The sensor unit 302 includes a first sensor which detects a signal from the pattern 202 in a read region 211 (a first read region) and a second sensor which detects a signal from the pattern 203 in a read region 212 (a second read region). The M-sequence sensor unit 301 includes a third sensor which detects a signal from the pattern 501 in a read region 213. The M-sequence sensor unit 301 and the sensor unit 302 are attached to positions different by 180 degrees from each other with respect to the center point 220 that is a rotary central shaft.

Points 221 and 222 in FIG. 2 are positioned on the same line segment which has a starting point of the center point 220 of the patterns 202 and 203, and are points which are positioned inside the read regions 211 and 212 with reference to the center point 220 of the patterns. When a distance between the center point 220 and the point 221 is defined as R1 and a distance between the center point 220 and the point 222 is defined as R2, R1 and R2 are equal to 4.07 mm and 3.26 mm respectively in the present embodiment. In the present embodiment, the number of the slits S1 of the pattern 202 is 200 and the number of the slits of the pattern 203 is 160. Using these values, the condition of $S1/R1 \approx S2/R2$ are met.

In the present embodiment, the points 221 and 222 are set near the center of the read regions 211 and 212, respectively, but are not limited to this. As the points 221 and 222, arbitrary points positioned inside the read regions 211 and 212 respectively can be used. In the embodiment, the maximum value of the distance from the center point 220 in the read region 211 is defined as $R1_{max}$ and the minimum value of the distance is defined as $R1_{min}$.

Additionally, in the read region 212, the maximum value of the distance from the center position 220 is defined as $R2_{max}$, and the minimum value of the distance is defined as $R2_{min}$. In this case, the numbers of the slits S1 and S2 and the distances R1 and R2 may be set so as to meet the following Expression (1).

$$R1_{min}/R2_{max} \leq S1/S2 \leq R1_{max}/R2_{min} \quad (1)$$

Figure 3A:
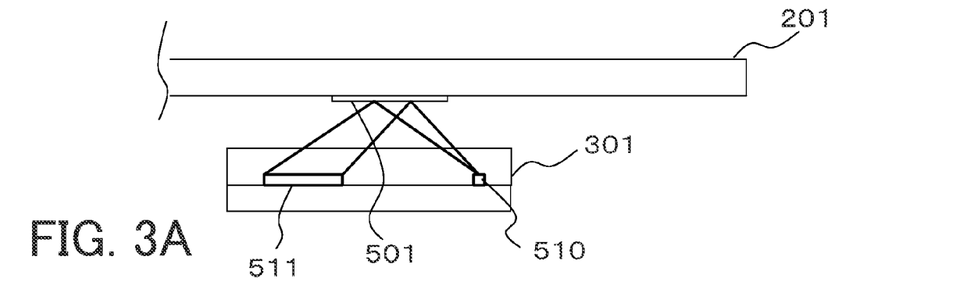
FIGS. 3A and 3B are configuration diagrams of an M-sequence sensor unit in Embodiment 1.
Figure 3B:
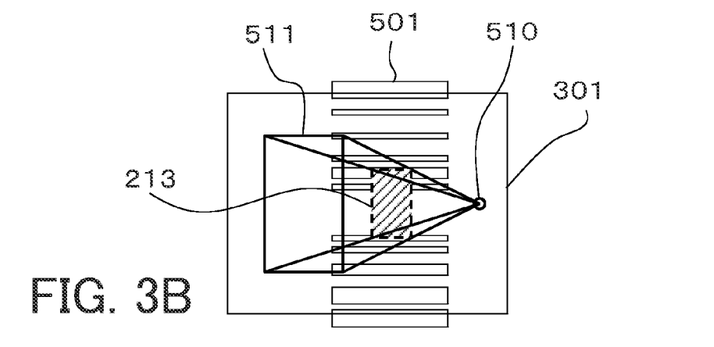

FIGS. 3A and 3B are configuration diagrams of the M-sequence sensor unit 301 in the present embodiment, and specifically, FIGS. 3A and 3B illustrate a side view and a top view, respectively. Divergent light beam emitted from an LED 510 (a light source) in the M-sequence sensor unit 301 is irradiated on the pattern 501 of the rotary scale 201, and is reflected to a photo diode array 511 in the M-sequence sensor unit 301. The light beam received by the photo diode array 511 is converted into an electric signal to be converted into an absolute angle signal θABS by the signal processing circuit 401. Thus, in the present embodiment, the absolute angle signal θABS is obtained from the M-sequence sensor unit 301.

Figure 4A:
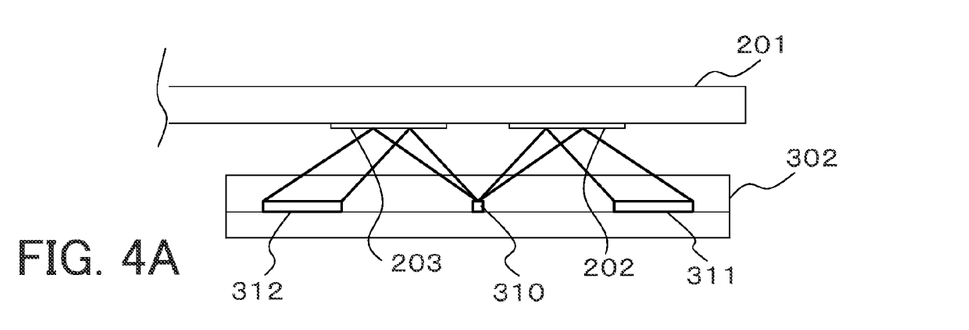
FIGS. 4A and 4B are configuration diagrams of a sensor unit in Embodiment 1.
Figure 4B:
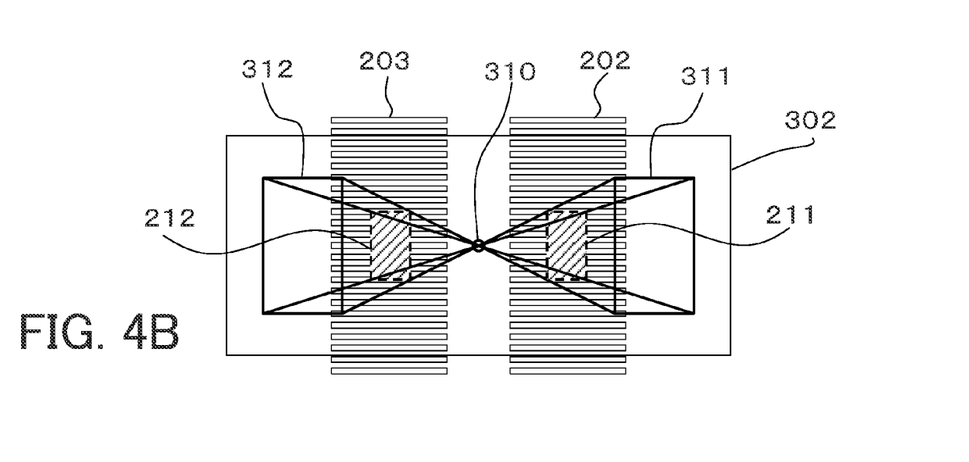

FIGS. 4A and 4B are configuration diagrams of the sensor unit 302 in the present embodiment, and specifically FIGS. 4A and 4B illustrate a side view and a top view, respectively. The sensor unit 302 is a light receiving and emitting integrated sensor unit in which an LED 310 (a light source) and photo diode arrays 311 and 312 (a first sensor and a second sensor) are mounted in the same package. The photo diode arrays 311 and 312 are formed with the same array pitch. Since a method of using a light receiving element array which is provided with a function as an index scale in an optical encoder is previously described for detail in Japanese Patent Laid-Open No. 2006-214929, the description of the principle of detecting an encoder signal is omitted.

Divergent light beam emitted from the LED 310 in the sensor unit 302 is irradiated onto the read regions 211 and 212 on the patterns 202 and 203, respectively, of the rotary scale 201. As illustrated in FIG. 4B, the positions of the read regions 211 and 212 are regions that are surrounded by center points of lines connecting the LED 310 and four corners of the light receiving regions of the photo diode arrays 311 and 312, respectively. The light beam reflected on the read regions 211 and 212 are received by the photo diode arrays 311 and 312 in the sensor unit 302, respectively. Thus, the sensor unit 302 is configured so as to receive light which is irradiated from the LED 310 that is one light source using both the photo diode array 311 that is the first sensor and the photo diode array 312 that is the second sensor.

The light beam received by the photo diode arrays 311 and 312 are converted into an electric signal to be sent to the signal processing circuit 401 as an encoder signal. The signal processing circuit 401 performs an interpolation process by an arctangent calculation to calculate increment outputs θinc1 and θinc2 from the photo diode arrays 311 and 312, respectively. The increment outputs θinc1 and θinc2 are phases of signals which are detected by the photo diode arrays 311 and 312, respectively. Furthermore, the signal processing circuit 401 calculates a vernier periodic signal θΔ (a first differential signal) by the calculation of θΔ=θinc1−θinc2.

Figure 5:
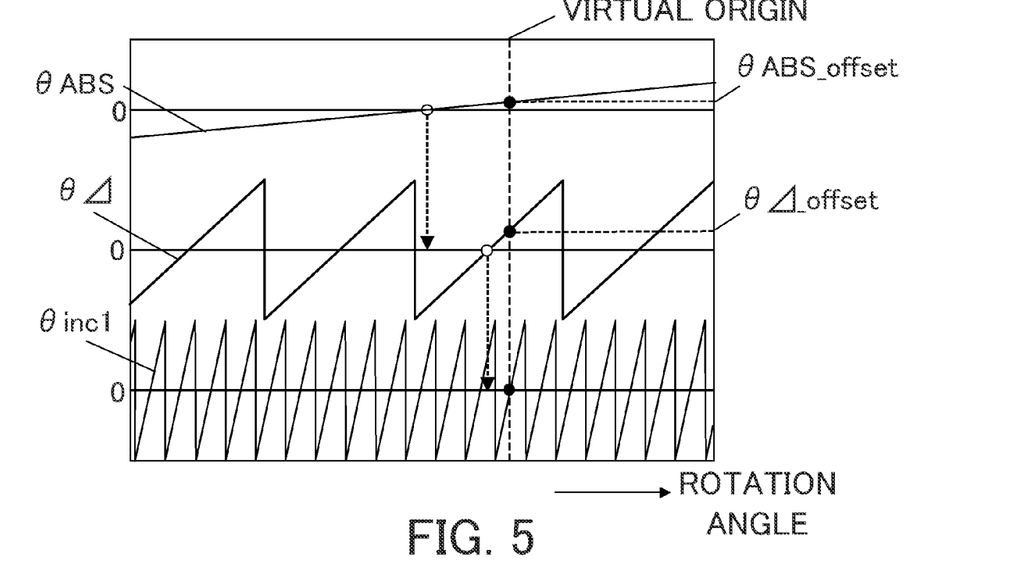
FIG. 5 is a diagram of describing an initialization operation in Embodiment 1.

Next, referring to FIG. 5, a procedure of the initialization operation in the present embodiment will be described. First of all, the rotary scale 201 is rotated in a predetermined direction. Then, zero-cross of the vernier periodic signal θΔ, which is obtained first after passing zero-cross of the absolute angle signal θABS is detected, and additionally zero-cross of the increment output θinc1 immediately after the zero-cross of the vernier periodic signal θΔ is detected. The point is set as a virtual origin. A phase of the absolute angle signal θABS at the virtual origin is defined as θABS_offset, and a phase of the vernier periodic signal θΔ at the same time is defined as θΔoffset. At the initialization operation, the signal processing circuit 401 writes the phases θABS_offset and θΔoffset into the storage unit 402.

Next, an angle detection operation will be described. The signal processing circuit 401 performs calculations of the following Expressions (2) and (3) using the absolute angle signal θABS, the increment outputs θinc1 and θinc2, and θABS_offset and θΔoffset which are stored in the storage unit 402.

$$\theta ABS' = Round[(\theta ABS - \theta ABS\_offset) - (\theta\Delta - \theta\Delta offset)/40] + (\theta\Delta - \theta\Delta offset)/40 \quad (2)$$

$$\theta ABS\_out = Round[(\theta ABS' - \theta inc1/200)] + \theta inc1/200 \quad (3)$$

In the expressions, Round[ ] means a function which performs a rounding process. The phase θABS_out obtained by the above process is outputted as an angle detection value, i.e. a rotation angle of the scale portion. In this case, because an angle detection error of θABS' caused by the decentering is suppressed, a phase synchronization from θABS' to the increment output θinc1 is stably performed.

Figure 6:
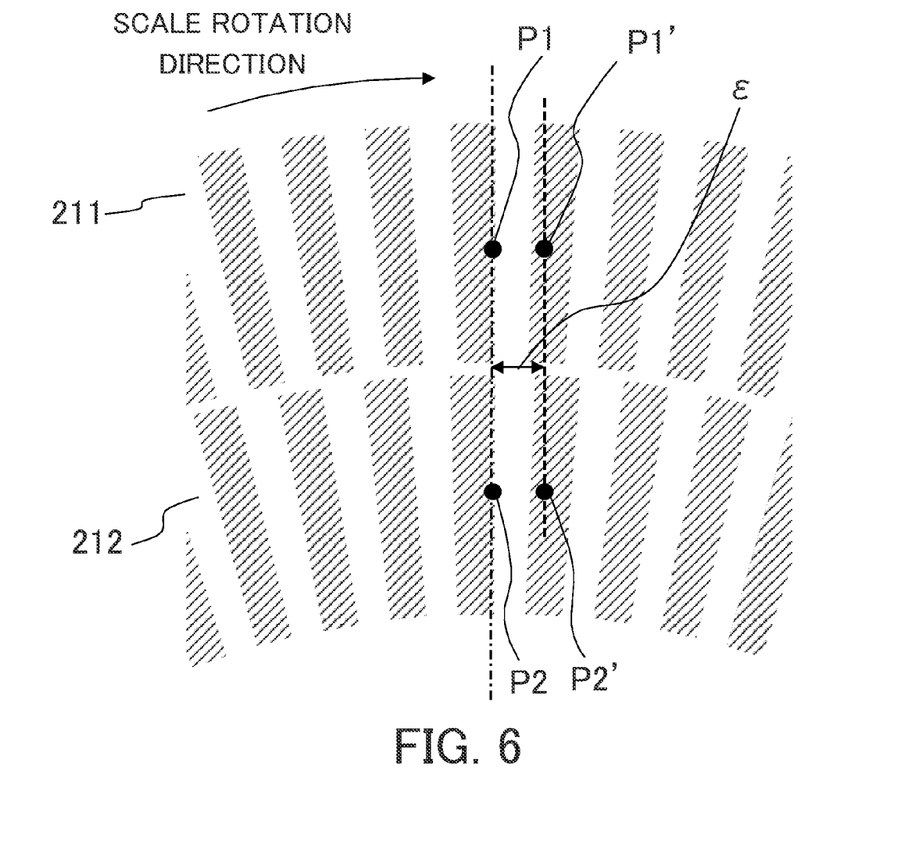
FIG. 6 is an enlarged diagram of a main part of a rotary scale in Embodiment 1.

FIG. 6 is an enlarged diagram of a main part of the rotary scale 201 in the present embodiment. When a point inside the read region 211 and a point inside the read region 212 on condition that the decentering does not occur are defined as P1 and P2 respectively, the points P1 and P2 are shifted to points P1' and P2' respectively by the decentering. When a shift amount in this case is defined as ε, a read angle error Δφ of the scale pattern is represented as Expression (4) on condition that ε<<R is met.

$$\Delta\phi = \tan^{-1}(\epsilon/R) \approx \epsilon/R \quad (4)$$

Accordingly, shift amounts Δθinc1 and Δθinc2 of the increment outputs θinc1 and θinc2 are represented as Expressions (5) and (6), respectively.

$$\Delta\theta inc1 \approx \Delta\phi \times S1 = \epsilon \times (S1/R1) \quad (5)$$

$$\Delta\theta inc2 \approx \Delta\phi \times S2 = \epsilon \times (S2/R2) \quad (6)$$

In the embodiment, two points that meet the condition of S1/R1≈S2/R2 are included in the read regions 211 and 212 of the photo diode arrays 311 and 312, respectively. Therefore, the following approximation is met as represented by Expression (7).

$$\Delta\theta inc1 \approx \Delta\theta inc2 \qquad (7)$$

Figure 7A:
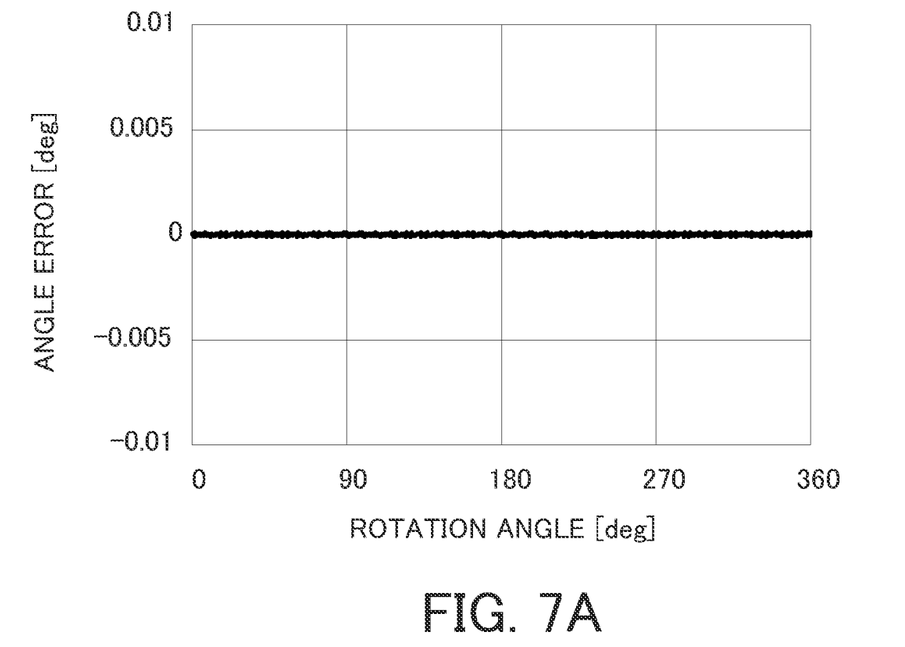
FIGS. 7A and 7B are graphs illustrating an angle error which is generated by a decentering in Embodiment 1.
Figure 7B:
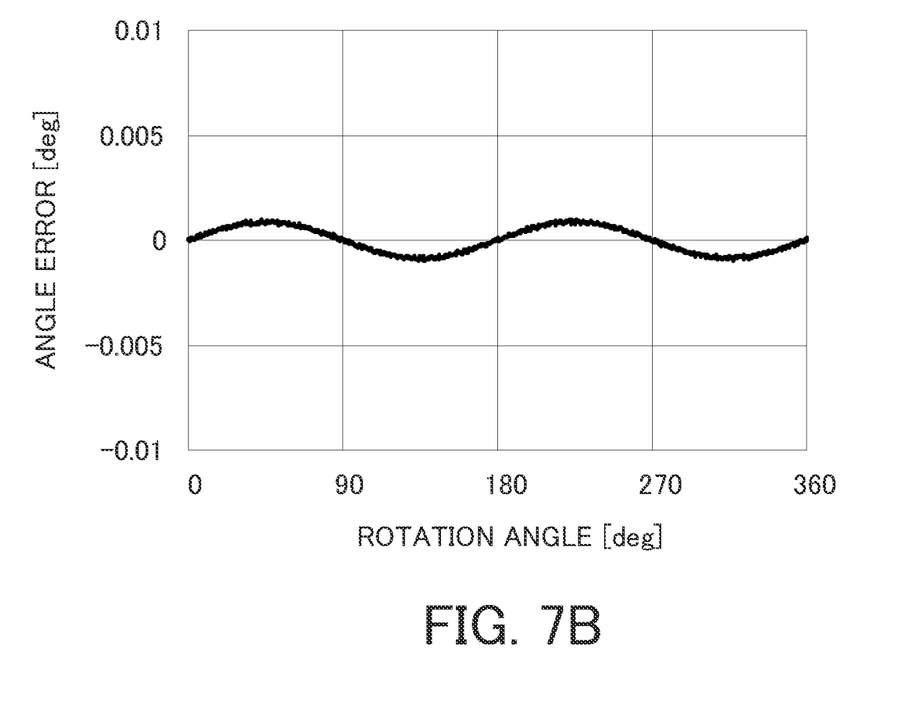

Accordingly, in a result of the calculation of the difference of the phases, the generation of the error is suppressed without being influenced by the decentering. FIGS. 7A and 7B are graphs illustrating angle errors of θABS', and specifically FIGS. 7A and 7B illustrate a state in which the decentering does not exist and a state in which the decentering of 20 μm is generated, respectively. If the angle error is in a permissible range, the phase synchronization of the lower increment output θinc1 can be ensured. In the present embodiment, since the lower period is 360/200 degree, the permissible range of the error of θABS' is around ±0.9 degree. As illustrated in FIGS. 7A and 7B, the influence of the decentering is suppressed up to an amount that is not a problem.

The rotary encoder 100 of the present embodiment is a reflective-type encoder, but the present embodiment is not limited to this and is also applicable to a transmissive-type encoder. The light receiving element (the sensor) may also be provided separately from the light emitting element (the light source). In the present embodiment, the absolute detection is performed by using the M-sequence, but the present embodiment is not limited to the method and the detection may also be performed using a gray code, a spiral pattern, a plurality of sensors, or a plurality of patterns.

As described above, in the present embodiment, because the number of the slits and a radius of the read region are set so as to suppress the angle detection error of the vernier periodic signal caused by the decentering, the stable angle detection can be achieved with high accuracy. Furthermore, a common light source irradiates a plurality of photo diode arrays to be able to reduce the size and the cost of the rotary encoder.

[Embodiment 2]

Figure 8:
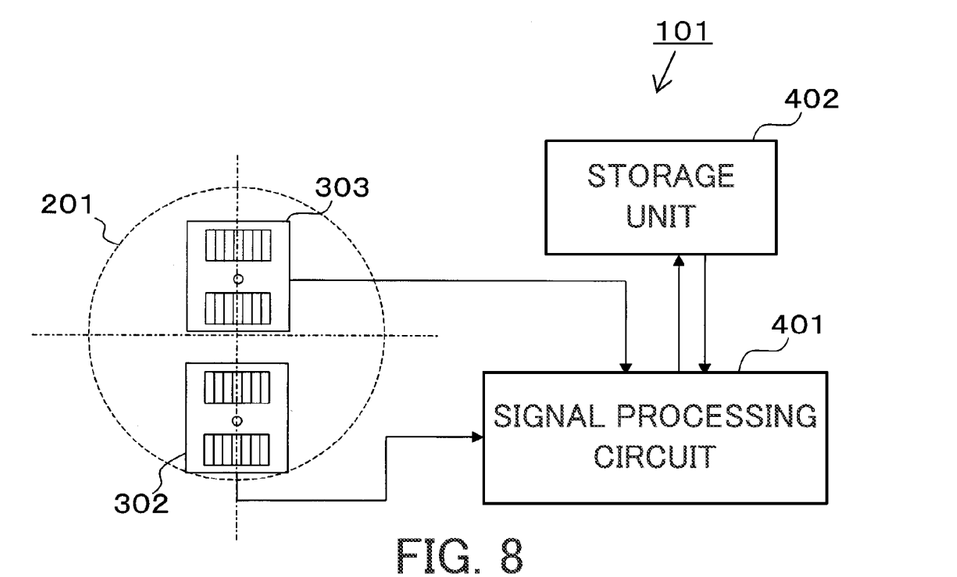
FIG. 8 is a configuration diagram of a rotary encoder in Embodiment 2.

FIG. 8 is a configuration diagram of a rotary encoder 101 in Embodiment 2. The rotary encoder 101 includes a rotary scale 201 which is attached to a rotary shaft, sensor units 302 and 303, a signal processing circuit 401, and a storage unit 402. The sensor units 302 and 303 constitute a sensor unit portion. The signal processing circuit 401 performs an interpolation process of encoder signals which are obtained by the sensor units 302 and 303, writes a signal into the storage unit 402, reads a signal of the storage unit 402, and the like.

Figure 9:
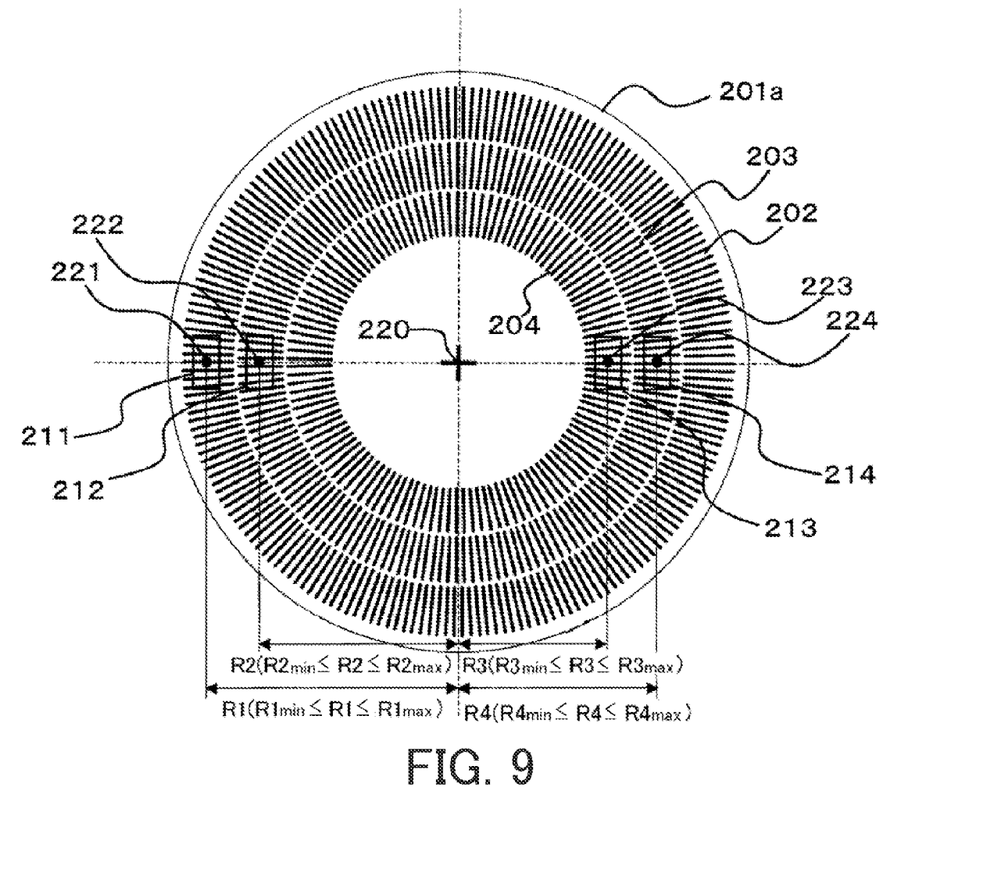
FIG. 9 is a configuration diagram of a rotary scale in Embodiment 2.

FIG. 9 is a configuration diagram of a rotary scale 201a in the present embodiment. The rotary scale 201a is provided with patterns 202, 203, and 204. The pattern 202 at the outer circumference (a first slit array) includes reflective slits, the number of which is S1. In the present embodiment, 200 reflective slits are formed in the pattern 202. The pattern 203 at the intermediate circumference (a second slit array) includes reflective slits, the number of which is S2. In the present embodiment, 160 reflective slits are formed in the pattern 203. The pattern 204 at the inner circumference (a third slit array) includes reflective slits the number of which is S3. In the present embodiment, 121 reflective slits are formed in the pattern 204. Each of these patterns 202, 203, and 204 is a radial pattern centered around the center point 220.

The sensor unit 302 includes a first sensor and a second sensor that detect signals from the patterns 202 and 203, respectively. The sensor unit 303 includes a fourth sensor and a third sensor that detect signals from the patterns 203 and 204, respectively. The third sensor and the fourth sensor detect signals in a read region 213 (a third read region) and a read region 214 (a fourth read region), respectively. The sensor units 302 and 303 are attached to positions different by 180 degrees from each other around a rotary central shaft (the center point 220).

With regard to the points 221 and 222 in FIG. 9, similarly to the case of Embodiment 1, the condition of S1/R1 ≈S2/R2 is met. Points 223 and 224 in FIG. 9 are positioned on the same line segment which has a starting point of the center point 220 of the patterns 204 and 203, and are points which are positioned inside the read regions 213 and 214. When a distance between the center point 220 and the point 223 is defined as R3 and a distance between the center point 220 and the point 224 is defined as R4, R3 and R4 are equal to 2.46 mm and 3.26 mm respectively in the present embodiment. In the present embodiment, the number of the slits S2 in the pattern 203 is 160, and the number of the slits S3 in the pattern 204 is 121. Using these values, the condition of S2/R4≈S3/R3 is met.

In the present embodiment, the points 223 and 224 are set near the center of the read regions 213 and 214, respectively, but the embodiment is not limited to this. As the points 223 and 224, arbitrary points that are positioned inside the read regions 213 and 214, respectively, can be used. In the embodiment, the maximum value and the minimum value of the distance from the center point 220 in the read region 213 are defined as $R3_{max}$ and $R3_{min}$, respectively.

Furthermore, the maximum value and the minimum value of the distance from the center point 220 in the read region 214 are defined as $R4_{max}$ and $R4_{min}$, respectively. In this case, the numbers of slits S2 and S3 and the distances R3 and R4 may be set so as to meet the following Expression (8).

$$R4_{min}/R3_{max} \leq S2/S3 \leq R4_{max}/R3_{min} \qquad (8)$$

The sensor unit 302 which detects signals from reflected lights on the read regions 211 and 212 sends the detected signals to the signal processing circuit 401 to obtain the increment outputs θinc1 and θinc2, respectively. Furthermore, the signal processing circuit 401 obtains a vernier periodic signal θΔ1 (a first differential signal) by the calculation of θΔ1=θinc1−θinc2. Similarly, the sensor unit 303 which detects signals from reflected lights on the read regions 213 and 214 sends the detected signals to the signal processing circuit 401 to obtain the increment outputs θinc3 and θinc4, respectively. Furthermore, the signal processing circuit 401 obtains a vernier periodic signal θΔ2 (a second differential signal) by the calculation of θΔ2=θinc4−θinc3.

Using these two vernier periodic signals θΔ1 and θΔ2, the absolute angle signal θABS which has one period per one rotation is obtained by the calculation of θABS=θΔ1−θΔ2. In other words, the signal processing circuit 401 calculates a rotation angle of the rotary scale 201a based on a difference between the first differential signal and the second differential signal.

Additionally, the signal processing circuit 401 obtains the lowest increment signal θinc that has the shortest period by the calculation of θinc=θinc2+θinc4. In this case, if it is a sum of opposed arrangements by 180 degrees, a different combination such as θinc=θinc1+θinc4 may also be adopted. In such a configuration, the influence of the decentering of the lowest periodic signal can be suppressed.

Next, a procedure of an initialization operation in the present embodiment will be described. First of all, the rotary scale 201a is rotated in a predetermined direction. Then, zero-cross of the vernier periodic signal θΔ1, which is obtained first after passing zero-cross of the absolute angle signal θABS, is detected, and additionally zero-cross of the increment output θinc immediately after the zero-cross of the vernier periodic signal θΔ1 is detected. The point is set as a virtual origin. A phase of the absolute angle signal θABS at the virtual origin is defined as θABS_offset, and a phase of the vernier periodic signal θΔ1 at the same time is defined as θΔoffset. At the initialization operation, the signal processing circuit 401 writes the phases θABS_offset and θΔoffset into the storage unit 402.

Next, an angle detection operation will be described. The signal processing circuit 401 performs calculations of the following Expressions (9) and (10) using the absolute angle signal θABS, the vernier periodic signal θΔ1, the increment output θinc, and the phases θABS_offset and θΔoffset which are stored in the storage unit 402.

$$\theta ABS' = \text{Round}[(\theta ABS - \theta ABS\_offset) - (\theta\Delta - \theta\Delta offset)/40] + (\theta\Delta - \theta\Delta offset)/40 \quad (9)$$

$$\theta ABS\_out = \text{Round}[(\theta ABS' - \theta inc/320) + \theta inc/320 \quad (10)$$

The phase θABS_out obtained as described above is outputted as an angle detection value (a rotation angle). In this case, as described in Embodiment 1, because an angle detection error of θABS' caused by the decentering is suppressed, a phase synchronization from θABS' to the increment output θinc is stably performed. Additionally, since the influence of the decentering is suppressed with regard to the absolute signal θABS generated from the vernier periodic signals θΔ1 and θΔ2, the phase synchronization between the absolute signal θABS and the vernier periodic signal θΔ1 is also performed stably. Thus, in the present embodiment, because the influence of the decentering is also suppressed for the highest absolute signal, highly accurate detection can be performed.

[Embodiment 3]

Figure 10:
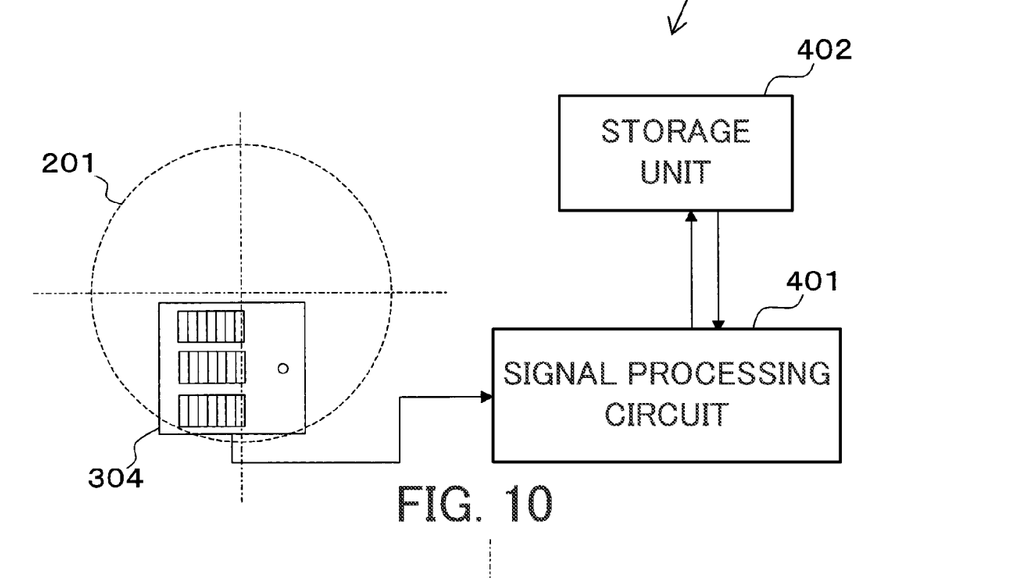
FIG. 10 is a configuration diagram of a rotary encoder in Embodiment 3.

FIG. 10 is a configuration diagram of a rotary encoder 102 in Embodiment 3. The rotary encoder 102 includes a rotary scale 201a which is attached to a rotary shaft, a sensor unit 304 (a sensor unit portion), a signal processing circuit 401, and a storage unit 402. The control processing circuit 401 performs an interpolation process of an encoder signal obtained by the sensor unit 304, writes a signal into the storage unit 402, read a signal of the storage unit 402, and the like.

Figure 11:
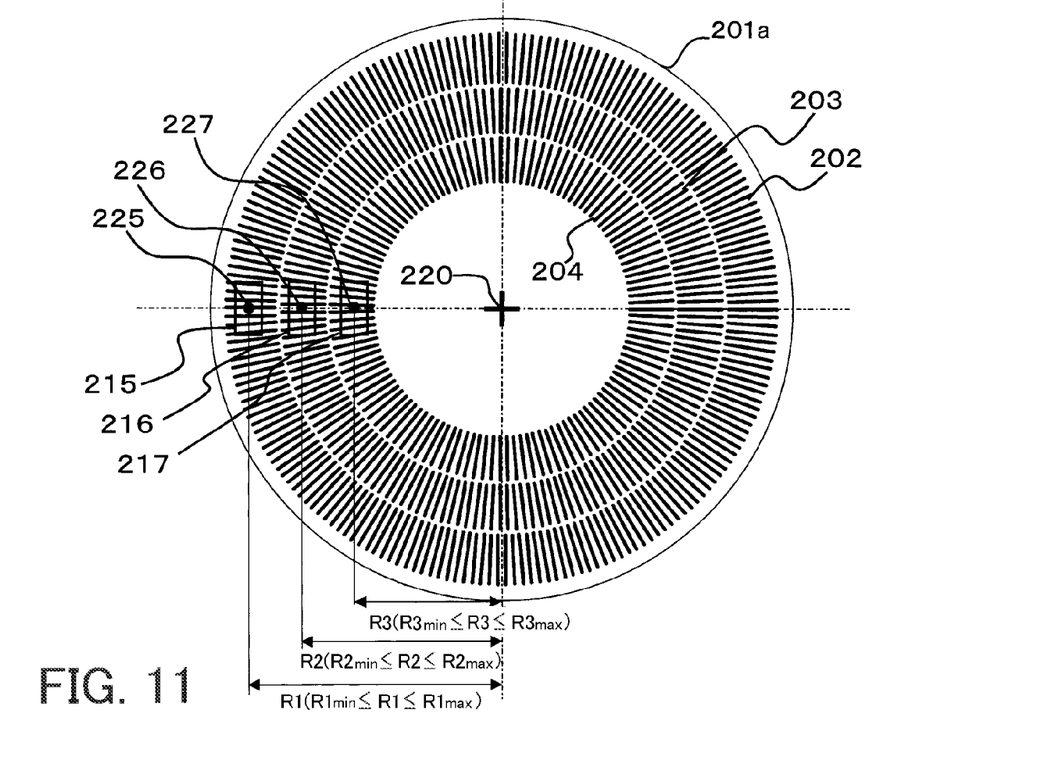
FIG. 11 is a configuration diagram of a rotary scale in Embodiment 3.

FIG. 11 is a configuration diagram of the rotary scale 201a in the present embodiment. The rotary scale 201a is the same as that of Embodiment 2. The sensor unit 304 includes first, second, and third sensors that detect signals from patterns 202, 203, and 204 (first, second, and third slit arrays), respectively. Points 225, 226, and 227 in FIG. 11 are positioned on the same line segment which has a starting point of a center point 220, and are points which have distances R1, R2, and R3 from the center point 220 of 4.07 mm, 3.26 mm, and 2.46 mm, respectively. In the present embodiment, the number of slits S1 of the pattern 202 is 200, the number of slits S2 of the pattern 203 is 160, and the number of slits S3 of the pattern 204 is 121. Therefore, the condition of S1/R1≈S2/R2≈S3/R3 is met.

In the present embodiment, the points 225, 226, and 227 are set near the center of read regions 215, 216, and 217, respectively, but the embodiment is not limited to this. As the points 225, 226, and 227, arbitrary points that are positioned inside the read regions 215, 216, and 217, respectively, can be used. In the embodiment, the maximum value and the minimum value of the distance from the center point 220 in the read region 215 are defined as $R1_{max}$ and $R1_{min}$, respectively. The maximum value and the minimum value of the distance from the center point 220 in the read region 216 are defined as $R2_{max}$ and $R2_{min}$, respectively. Furthermore, the maximum value and the minimum value of the distance from the center point 220 in the read region 217 are defined as $R3_{max}$ and $R3_{min}$, respectively. In this case, the numbers of slits S1, S2, and S3 and the distances R1, R2, and R3 may be set so as to meet both the following Expressions (11) and (12).

$$R1_{min}/R2_{max} \leq S1/S2 \leq R1_{max}/R2_{min} \quad (11)$$

$$R2_{min}/R3_{max} \leq S2/S3 \leq R2_{max}/R3_{min} \quad (12)$$

Figure 12A:
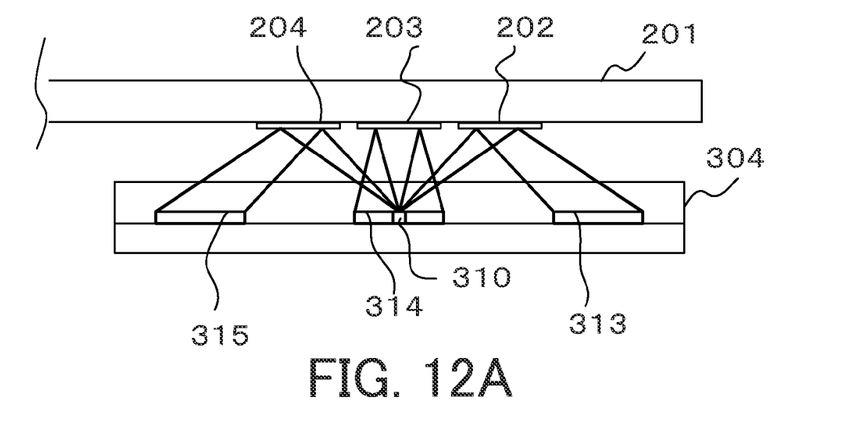
FIGS. 12A and 12B are configuration diagrams of a sensor unit in Embodiment 3.
Figure 12B:
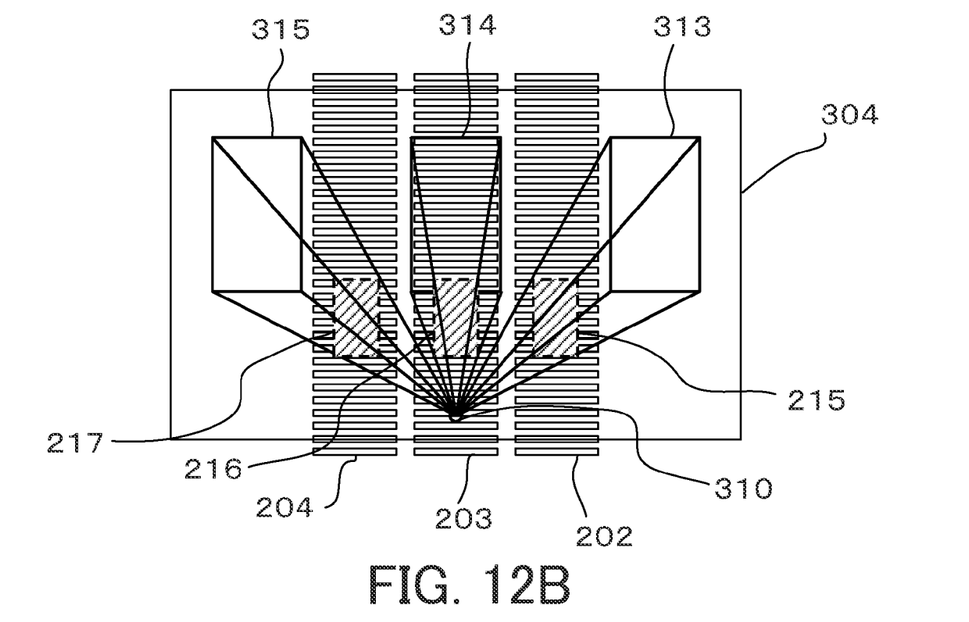

FIGS. 12A and 12B are configuration diagrams of the sensor unit 304 in the present embodiment, and specifically FIGS. 12A and 12B illustrate a side view and a top view of the sensor unit 304, respectively. The sensor unit 304 is a light receiving and emitting integrated sensor unit which is configured by mounting an LED 310 and photo diode arrays 313, 314, and 315 in the same package. The photo diode arrays 313, 314, and 315 (the first, second, and third sensors) are formed with the same array pitch.

Divergent light beam emitted from the LED 310 in the sensor unit 304 is irradiated onto the read regions 215, 216, and 217 on the patterns 202, 203, and 204 of the rotary scale 201a. In FIG. 12B, positions of the read regions 215, 216, and 217 are regions that are surrounded by center points of lines connecting the LED 310 and four corners of the photo diode arrays 313, 314, and 315, respectively.

Light beams reflected on the read regions 215, 216, and 217 are reflected to the photo diode arrays 313, 314, and 315 in the sensor unit 304, respectively. The light beams received by the photo diode arrays 313, 314, and 315 are converted into electric signals to be sent to the signal processing circuit 401 as encoder signals. The signal processing circuit 401 performs an interpolation process by an arctangent calculation to obtain increment outputs θinc1, θinc2, and θinc3, respectively. The signal processing circuit 401 calculates a vernier periodic signal θΔ1 by the calculation of θΔ1=θinc1−θinc2. Similarly, the signal processing circuit 401 calculates a vernier periodic signal θΔ2 by the calculation of θΔ2=θinc2−θinc3. Furthermore, the signal processing circuit 401 obtains an absolute signal θABS which has one period per one rotation by the calculation of θABS=θΔ1−θΔ2.

Next, an angle detection operation will be described. A procedure of an initialization operation in the present embodiment is the same as that in Embodiment 2, and therefore the descriptions thereof will be omitted. The signal processing circuit 401 performs calculations of the following Expressions (13) and (14) using the absolute angle signal θABS, the vernier periodic signal θΔ1, the increment output θinc1, and the phases θABS_offset and θΔoffset which are stored in the storage unit 402.

$$\theta ABS' = \text{Round}[(\theta ABS - \theta ABS\_offset) - (\theta\Delta 1 - \theta\Delta offset)/40] + (\theta\Delta 1 - \theta\Delta offset)/40 \quad (13)$$

$$\theta ABS\_out = \text{Round}[(\theta ABS' - \theta inc1/200) + \theta inc1/200 \quad (14)$$

The phase θABS_out obtained as described above is outputted as an angle detection value. In this case, as described in Embodiment 1, because an angle detection error of θABS' caused by the decentering is suppressed, a phase synchronization from θABS' to the increment output θinc1 is stably performed. Additionally, since the influence of the decentering is suppressed for the absolute signal θABS generated from the vernier periodic signals θΔ1 and θΔ2, the phase synchronization between the absolute signal θABS and the vernier periodic signal θΔ1 is also performed stably. Accordingly to the present embodiment, because the influence of the decentering is also suppressed for the highest absolute signal, stable detection can be performed.

According to each of the above embodiments, in the vernier detection, a highly accurate rotary encoder which reduces a detection error generated by the decentering can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291688, filed on Dec. 24, 2009, which is hereby incorporated by reference herein in its entirety.

What is claimed is:

1. A rotary encoder comprising:
a scale portion in which a first slit array having slits, the number of which is S1, and a second slit array having slits, the number of which is S2, are formed concentrically with respect to a center point;
a sensor unit including a first sensor that detects a signal from the first slit array in a first read region and a second sensor that detects a signal from the second slit array in a second read region; and
a signal processing circuit configured to process the signal detected by the sensor unit,
wherein the following expression is met, $$R1\mathrm{min}/R2\mathrm{max} \leq S1/S2 \leq R1\mathrm{max}/R2\mathrm{min}$$

where R1max and R1min are respectively the maximum value and the minimum value of a distance from the center point in the first read region and R2max and R2min are respectively the maximum value and the minimum value of a distance from the center point in the second read region:
wherein the sensor unit is configured so that light that is irradiated from one light source is received by both the first sensor and the second sensor.

2. The rotary encoder according to claim 1,
wherein the scale portion includes an absolute position detecting pattern,
wherein the sensor unit includes a third sensor that detects a signal from the absolute position detecting pattern, and
wherein the signal processing circuit calculates a first differential signal based on a difference between a phase of the signal detected by the first sensor and a phase of the signal detected by the second sensor to calculate a rotation angle of the scale portion using the signal detected by the third sensor and the first differential signal.

3. The rotary encoder according to claim 1,
wherein the scale portion is further provided with a third slit array having slits, the number of which is S3, formed concentrically with respect to the center point,
wherein the sensor unit further includes a third sensor that detects a signal from the third slit array in a third read region and a fourth sensor that detects a signal from the second slit array in a fourth read region,
wherein the following expression is met, $$R4\mathrm{min}/R3\mathrm{max} \leq S2/S3 \leq R4\mathrm{max}/R3\mathrm{min}$$

where R3max and R3min are respectively the maximum value and the minimum value of a distance from the center point in the third read region and R4max and R4min are respectively the maximum value and the minimum value of a distance from the center point in the fourth read region, and
wherein the signal processing circuit calculates a first differential signal based on a difference between a phase of the signal detected by the first sensor and a phase of the signal detected by the second sensor, calculates a second differential signal based on a difference between a phase of the signal detected by the third sensor and a phase of the signal detected by the fourth sensor, and calculates a rotation angle of the scale portion based on a difference between the first differential signal and the second differential signal.

4. The rotary encoder according to claim 1,
wherein the scale portion is further provided with a third slit array having slits, the number of which is S3, formed concentrically with respect to the center point,
wherein the sensor unit further includes a third sensor that detects a signal from the third slit array in a third read region,
wherein the following expression is met, $$R2\mathrm{min}/R3\mathrm{max} \leq S2/S3 \leq R2\mathrm{max}/R3\mathrm{min}$$

where R3max and R3min are respectively the maximum value and the minimum value of a distance from the center point in the third read region.

5. A rotary encoder comprising:
a scale portion in which a first slit array having slits, the number of which is S1, and a second slit array having slits, the number of which is S2, are formed concentrically with respect to a center point;
a sensor unit including a first sensor that detects a signal from the first slit array in a first read region and a second sensor that detects a signal from the second slit array in a second read region; and
a signal processing circuit configured to process the signal detected by the sensor unit,
wherein the following expression is met, $$R1\mathrm{min}/R2\mathrm{max} \leq S1/S2 \leq R1\mathrm{max}/R2\mathrm{min}$$

where R1max and R1min are respectively the maximum value and the minimum value of a distance from the center point in the first read region and R2max and R2min are respectively the maximum value and the minimum value of a distance from the center point in the second read region;
wherein the scale portion includes an absolute position detecting pattern,
wherein the sensor unit includes a third sensor that detects a signal from the absolute position detecting pattern, and
wherein the signal processing circuit calculates a first differential signal based on a difference between a phase of the signal detected by the first sensor and a phase of the signal detected by the second sensor to calculate a rotation angle of the scale portion using the signal detected by the third sensor and the first differential signal.

6. A rotary encoder comprising:
a scale portion in which a first slit array having slits, the number of which is S1, and a second slit array having slits, the number of which is S2, are formed concentrically with respect to a center point;
a sensor unit including a first sensor that detects a signal from the first slit array in a first read region and a second sensor that detects a signal from the second slit array in a second read region; and
a signal processing circuit configured to process the signal detected by the sensor unit,
wherein the following expression is met, $$R1\mathrm{min}/R2\mathrm{max} \leq S1/S2 \leq R1\mathrm{max}/R2\mathrm{min}$$

where R1max and R1min are respectively the maximum value and the minimum value of a distance from the center point in the first read region and R2max and R2min are respectively the maximum value and the minimum value of a distance from the center point in the second read region;

wherein the scale portion is further provided with a third slit array having slits, the number of which is S3, formed concentrically with respect to the center point, wherein the sensor unit further includes a third sensor that detects a signal from the third slit array in a third read region and a fourth sensor that detects a signal from the second slit array in a fourth read region, wherein the following expression is met, $$R4\text{min}/R3\text{max} \leq S2/S3 \leq R4\text{max}/R3\text{min}$$

where R3max and R3min are respectively the maximum value and the minimum value of a distance from the center point in the third read region and R4max and R4min are respectively the maximum value and the minimum value of a distance from the center point in the fourth read region, and wherein the signal processing circuit calculates a first differential signal based on a difference between a phase of the signal detected by the first sensor and a phase of the signal detected by the second sensor, calculates a second differential signal based on a difference between a phase of the signal detected by the third sensor and a phase of the signal detected by the fourth sensor, and calculates a rotation angle of the scale portion based on a difference between the first differential signal and the second differential signal.

* * * * *